US008809805B2

(12) United States Patent
Horton et al.

(10) Patent No.: US 8,809,805 B2
(45) Date of Patent: Aug. 19, 2014

(54) RADIATION SHIELD LID FOR SELF-ALIGNING RADIOISOTOPE ELUTION SYSTEM

(71) Applicant: Mallinckrodt LLC, Hazelwood, MO (US)

(72) Inventors: Duane L. Horton, St. Louis, MO (US); Andrew D. Speth, St. Louis, MO (US)

(73) Assignee: Mallinckrodt LLC, Hazelwood, MO (US)

( * ) Notice: Subject to any disclaimer, the term of this patent is extended or adjusted under 35 U.S.C. 154(b) by 23 days.

(21) Appl. No.: 13/855,971

(22) Filed: Apr. 3, 2013

(65) Prior Publication Data

US 2013/0234052 A1 Sep. 12, 2013

Related U.S. Application Data

(63) Continuation of application No. 12/441,919, filed as application No. PCT/US2007/021344 on Oct. 3, 2007, now Pat. No. 8,431,909.

(60) Provisional application No. 60/849,869, filed on Oct. 6, 2006.

(51) Int. Cl.

| | |
|---|---|
| ***B01D 59/00*** | (2006.01) |
| ***G21F 5/018*** | (2006.01) |
| ***G21F 3/00*** | (2006.01) |
| *G21H 5/02* | (2006.01) |

(52) U.S. Cl.

CPC *G21F 5/018* (2013.01); *G21F 3/00* (2013.01); *G21H 5/02* (2013.01)

USPC .................................... 250/432 PD; 250/428

(58) Field of Classification Search

None

See application file for complete search history.

(56) References Cited

U.S. PATENT DOCUMENTS

| | | | | |
|---|---|---|---|---|
| 3,369,121 A | | 2/1968 | Bruno et al. | |
| 3,615,869 A | * | 10/1971 | Barker et al. | 136/236.1 |
| 3,655,981 A | | 4/1972 | Montgomery et al. | |
| 3,663,306 A | * | 5/1972 | Des Champs et al. | 136/202 |
| 3,710,118 A | * | 1/1973 | Holgate et al. | 250/432 R |
| 3,920,995 A | * | 11/1975 | Czaplinski et al. | 250/432 R |
| 3,946,238 A | * | 3/1976 | Fries | 250/432 PD |
| 4,020,351 A | * | 4/1977 | Gemmill, Sr. et al. | 250/432 PD |
| 4,084,097 A | * | 4/1978 | Czaplinski et al. | 250/506.1 |
| 4,160,910 A | * | 7/1979 | Thornton et al. | 250/432 PD |
| 4,188,539 A | | 2/1980 | Strecker | |
| 4,245,685 A | | 1/1981 | Nemitz et al. | |
| 4,308,460 A | * | 12/1981 | Groh et al. | 250/506.1 |
| 4,387,303 A | | 6/1983 | Benjamins | |
| 4,663,115 A | * | 5/1987 | Russell | 376/320 |
| 4,782,231 A | | 11/1988 | Svoboda et al. | |
| 4,846,235 A | * | 7/1989 | Handke | 141/311 R |
| 5,109,160 A | * | 4/1992 | Evers | 250/432 PD |
| 5,109,196 A | | 4/1992 | Wikswo, Jr. et al. | |

(Continued)

FOREIGN PATENT DOCUMENTS

| | | | |
|---|---|---|---|
| EP | 0739017 A1 | | 10/1996 |
| EP | 739017 A1 | * | 10/1996 |

(Continued)

*Primary Examiner* — Andrew Smyth

(74) *Attorney, Agent, or Firm* — Armstrong Teasdale LLP

(57) ABSTRACT

A radiation shield lid for shielding a radioisotope generator. The radiation shield lid includes an alignment structure configured to align the shield lid to a radioisotope generator.

11 Claims, 9 Drawing Sheets

(56) References Cited

U.S. PATENT DOCUMENTS

| | | | | | |
|---|---|---|---|---|---|
| 5,111,099 | A | * | 5/1992 | Smith | |
| 5,274,239 | A | * | 12/1993 | Lane et al. | 250/370.01 |
| 5,309,959 | A | | 5/1994 | Shaw et al. | |
| 5,479,969 | A | * | 1/1996 | Hardie et al. | 141/130 |
| D389,761 | S | * | 1/1998 | Thomas | D10/103 |
| 5,734,169 | A | * | 3/1998 | Saidian | 250/506.1 |
| 5,834,788 | A | * | 11/1998 | Fu et al. | 250/506.1 |
| 7,060,998 | B2 | * | 6/2006 | Forrest et al. | 250/506.1 |
| 7,091,494 | B2 | * | 8/2006 | Weisner et al. | 250/432 PD |
| 7,504,646 | B2 | * | 3/2009 | Balestracci et al. | 250/507.1 |
| 7,592,605 | B2 | * | 9/2009 | Weisner et al. | 250/432 PD |
| 7,700,926 | B2 | * | 4/2010 | Tartaglia et al. | 250/432 PD |
| 7,753,835 | B2 | | 7/2010 | Van Der Lee et al. | |
| 7,772,565 | B2 | * | 8/2010 | Wilson | 250/428 |
| 7,812,322 | B2 | * | 10/2010 | Wagner et al. | 250/432 R |
| 7,838,844 | B2 | | 11/2010 | Wagner et al. | |
| 8,003,967 | B2 | * | 8/2011 | Fago et al. | 250/506.1 |
| 8,231,858 | B2 | | 7/2012 | Storey et al. | |
| 2005/0104016 | A1 | * | 5/2005 | Forrest et al. | 250/506.1 |
| 2005/0116186 | A1 | * | 6/2005 | Weisner et al. | 250/505.1 |
| 2005/0253085 | A1 | * | 11/2005 | Weisner et al. | 250/432 PD |
| 2007/0071670 | A1 | | 3/2007 | Storey et al. | |
| 2008/0167621 | A1 | | 7/2008 | Wagner et al. | |
| 2008/0185532 | A1 | * | 8/2008 | Wilson | 250/428 |
| 2008/0191148 | A1 | * | 8/2008 | Gibson | 250/432 PD |
| 2008/0197302 | A1 | * | 8/2008 | Fago et al. | 250/506.1 |
| 2008/0200747 | A1 | * | 8/2008 | Wagner et al. | 600/5 |
| 2008/0203318 | A1 | * | 8/2008 | Wagner et al. | 250/432 PD |
| 2008/0210891 | A1 | * | 9/2008 | Wagner et al. | 250/507.1 |
| 2008/0224065 | A1 | * | 9/2008 | Pollard Jr. | 250/432 R |
| 2008/0245977 | A1 | * | 10/2008 | Fago et al. | 250/505.1 |
| 2008/0277594 | A1 | | 11/2008 | Wagner et al. | |

FOREIGN PATENT DOCUMENTS

| | | | | |
|---|---|---|---|---|
| GB | 1473236 | | | 5/1977 |
| GB | 2386743 | | | 9/2003 |
| GB | 2386743 | A | * | 9/2003 |
| WO | 2007016172 | A2 | | 2/2007 |
| WO | WO 2007016172 | A2 | * | 2/2007 |

* cited by examiner

RADIATION SHIELD LID FOR SELF-ALIGNING RADIOISOTOPE ELUTION SYSTEM

CROSS REFERENCE TO RELATED APPLICATIONS

This application is a continuation of U.S. application Ser. No. 12/441,919 filed Mar. 19, 2009, which is a National Stage Entry of PCT/US2007/021344 filed Oct. 3, 2007, which claims priority from U.S. Provisional Application No. 60/849,869, filed Oct. 6, 2006, all of which are incorporated herein by reference.

FIELD OF THE INVENTION

The invention relates generally to radioisotope elution systems and, more specifically, to self-aligning components for use in such systems.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Nuclear medicine uses radioactive material for diagnostic and therapeutic purposes by injecting a patient with a dose of the radioactive material, which concentrates in certain organs or biological regions of the patient. Radioactive materials typically used for nuclear medicine include Technetium-99m, Indium-111, and Thallium-201 among others. Some chemical forms of radioactive materials naturally concentrate in a particular tissue, for example, iodide (I-131) concentrates in the thyroid. Radioactive materials are often combined with a tagging or organ-seeking agent, which targets the radioactive material for the desired organ or biologic region of the patient. These radioactive materials alone or in combination with a tagging agent are typically referred to as radiopharmaceuticals in the field of nuclear medicine. At relatively low doses of the radiopharmaceutical, a radiation imaging system (e.g., a gamma camera) may be utilized to provide an image of the organ or biological region that collects the radiopharmaceutical. Irregularities in the image are often indicative of a pathology, such as cancer. Higher doses of the radiopharmaceutical may be used to deliver a therapeutic dose of radiation directly to the pathologic tissue, such as cancer cells.

A variety of systems are used to generate, enclose, transport, dispense, and administer radiopharmaceuticals. Using these systems often involves manual alignment of components, such as male and female connectors of containers. Unfortunately, the male connectors can be damaged due to misalignment with the corresponding female connectors. For example, hollow needles can be bent, crushed, or broken due to misalignment with female connectors. As a result, the systems operate less effectively or become completely useless. If the systems contain radiopharmaceuticals, then the damaged connectors can result in monetary losses or delays with respect to nuclear medicine procedures.

SUMMARY

Certain exemplary aspects of the invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

In some embodiments of the present invention, a radioisotope elution system includes self-aligning components that protect needles from being damaged. In one embodiment, a radioisotope generator includes an alignment structure that is keyed to a complementary alignment structure on a lid of an auxiliary radiation shield. The complementary alignment structure may be inserted into the alignment structure, and the position of the lid relative to the radioisotope generator may be generally fixed. Once these components are aligned, apertures in the lid may be used to guide various components onto the needles of the generator in a controlled manner, thereby reducing the likelihood of a misaligned component damaging the needles.

A first aspect of the present invention is directed to a radioisotope elution system that includes a radioisotope generator having an alignment structure configured to interface with a complementary alignment structure on a radiation shield.

A second aspect of the invention is directed to a radiation shield for shielding a radioisotope generator. The radiation shield has a shield lid that includes an alignment structure configured to align the shield lid to a radioisotope generator.

A third aspect of the invention is directed to radioisotope elution system that includes an auxiliary shield having a top plane, a shield lid that includes a handle, and a radioisotope generator disposed in the auxiliary shield and biased by the weight of the shield lid. The shield lid may be disposed in the auxiliary shield, and the handle may cross the top plane.

A fourth aspect of the invention is directed to a method of operating a radioisotope elution system. The method includes aligning a radiation shield lid to a radioisotope generator via a first alignment structure on the radiation shield lid and a second alignment structure on the radioisotope generator.

Various refinements exist of the features noted above in relation to the various aspects of the present invention. Further features may also be incorporated in these various aspects as well. These refinements and additional features may exist individually or in any combination. For instance, various features discussed below in relation to one or more of the illustrated embodiments may be incorporated into any of the above-described aspects of the present invention alone or in any combination. Again, the brief summary presented above is intended only to familiarize the reader with certain aspects and contexts of the present invention without limitation to the claimed subject matter.

BRIEF DESCRIPTION OF THE FIGURES

Various features, aspects, and advantages of the present invention will become better understood when the following detailed description is read with reference to the accompanying figures in which like characters represent like parts throughout the figures, wherein.

DETAILED DESCRIPTION OF SPECIFIC EMBODIMENTS

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a", "an", "the", and "said" are intended to mean that there are one or more of the elements. The terms "comprising", "including", and "having" are intended to be inclusive and mean that there may be additional elements other than the listed elements. Moreover, the use of "top", "bottom", "above", "below" and variations of these terms is made for convenience, but does not require any particular orientation of the components. As used herein, the term "coupled" refers to the condition of being directly or indirectly connected or in contact.

Figure 1:
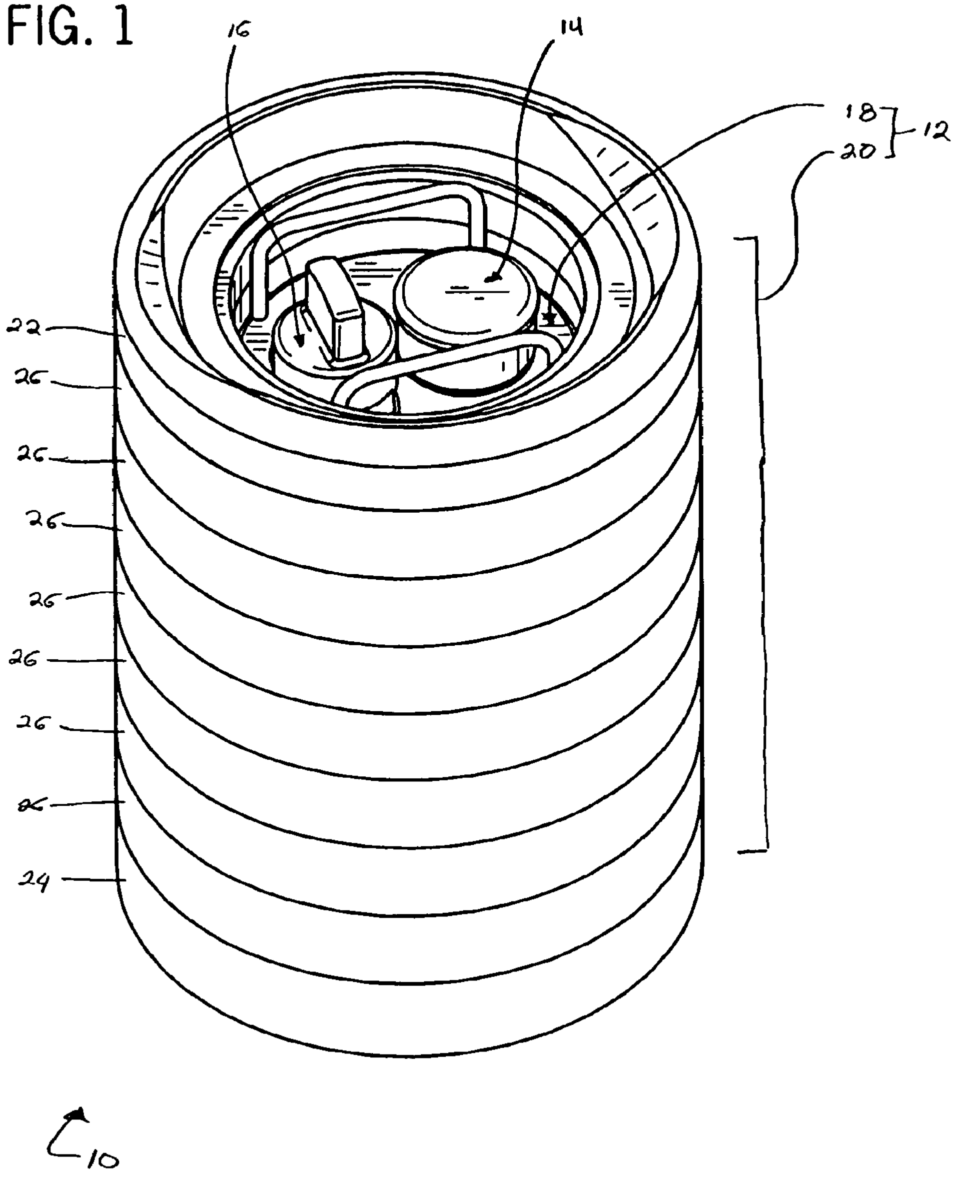
FIG. 1 is a perspective view of a radioisotope elution system.

FIG. 1 shows an exemplary radioisotope elution system 10 that includes an auxiliary shield assembly 12, an elution tool 14, and an eluant assembly 16. As discussed below, a variety of alignment structures, alignment mechanisms, and/or alignment indicators may be incorporated into the radioisotope elution system 10 to facilitate proper alignment of the various containers, hollow needles, radioisotope generator, and other components residing inside the auxiliary shield assembly 12.

The illustrated auxiliary shield assembly 12 includes an auxiliary shield lid 18 and an auxiliary shield 20. For brevity, the auxiliary shield lid 18 is referred to as a "lid." The auxiliary shield 20 may include a top ring 22, a base 24, and a plurality of step-shaped or generally tiered modular rings 26, which are disposed one over the other between the base 24 and the top ring 22 (see FIGS. 1 and 7). Substantially all or part of the illustrated auxiliary shield assembly 12 may be made of one or more suitable radiation shielding materials, such as depleted uranium, tungsten, tungsten impregnated plastic, or lead. One or more of the components of the auxiliary shield assembly 12 may be lined with, powder coated on, and/or embedded in other materials, such as an appropriate polymer material. For instance, in some embodiments, at least a portion (e.g., a majority, or a substantial entirety) of the lid 18 of the assembly 12 may be over-molded with polycarbonate resin (or other appropriate polymer). Embedding or over-molding the shielding materials may promote safety, enhance durability, and/or facilitate formation of components with smaller dimensional tolerances than components made entirely out of shielding materials. Moreover, the modular aspect of the rings 24 may tend to enhance adjustment of the height of the auxiliary shield 12, and the step-shaped configuration may tend to contain some radiation that might otherwise escape through an interface between the modular rings 26. While FIG. 1 depicts one example of an auxiliary shield assembly 12, it should be noted that other auxiliary shield assemblies may be employed.

Figure 2:
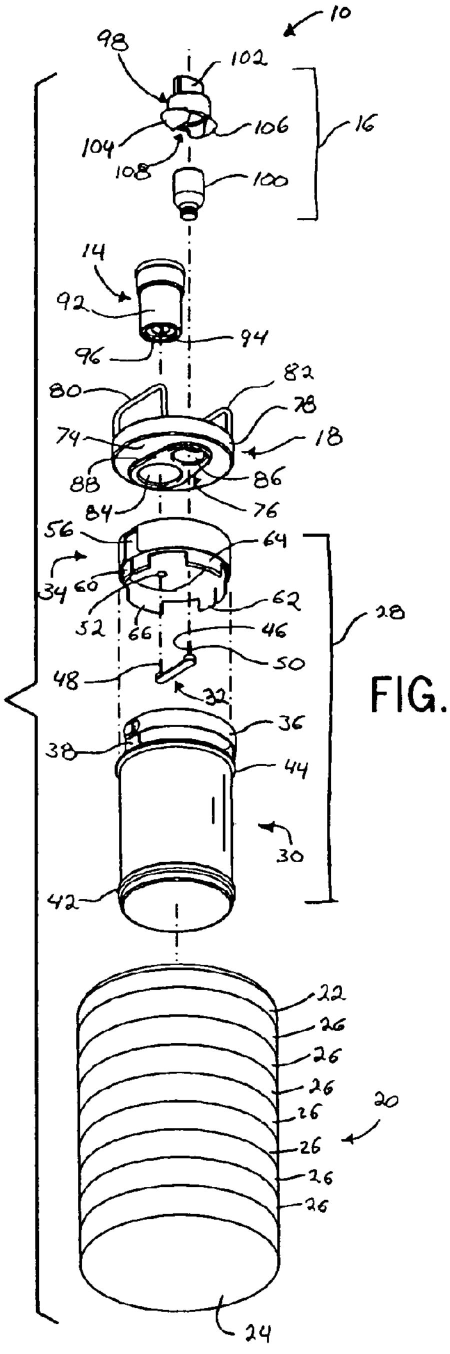
FIGS. 2, 3 are exploded views of the radioisotope elution system.
Figure 3:
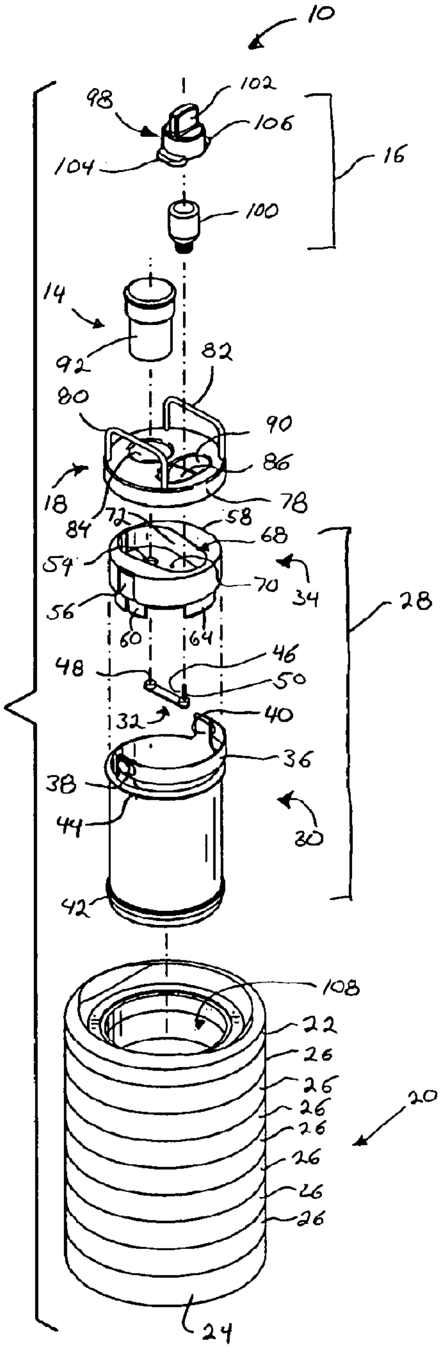

FIGS. 2, 3 are exploded views of the radioisotope elution system 10 from different perspectives. The auxiliary shield assembly 12 is designed to house a radioisotope generator 28 within the auxiliary shield 20 and under the lid 18. The radioisotope generator 28 may include a generator body 30, a needle assembly 32, and a cap 34.

The illustrated generator body 30 includes an elution column configured to generate and output a desired radioisotope. Except for the needle assembly 32, the various components of the elution column of the radioisotope generator 28 are not shown in detail. However, elution columns are well known to those of ordinary skill in the art (see U.S. Pat. No. 5,109,160 and US Patent Application Publication No. 2005/0253085, for example). As such, one of ordinary skill in the art could easily employ various aspects of the invention with radioisotope generators having a wide range of elution column designs.

Certain medically useful radioisotopes have relatively short half-lives (e.g., technetium-99m (Tc99m) has a half-life of approximately 6 hours). To potentially expand the useful life of the radioisotope generator 28, the elution column may include a more stable radioisotope that decays into the desired radioisotope (e.g., molybdenum-99 (Mo99) has a half-life of approximately 66 hours and decays into Tc99m). As the desired radioisotope is needed, it may be separated from the more stable radioisotope with an elution process, as explained below. The generator body 30 may also include shielding configured to diminish radiation, and tubing to conduct fluids into and out of the elution column.

Figure 7:
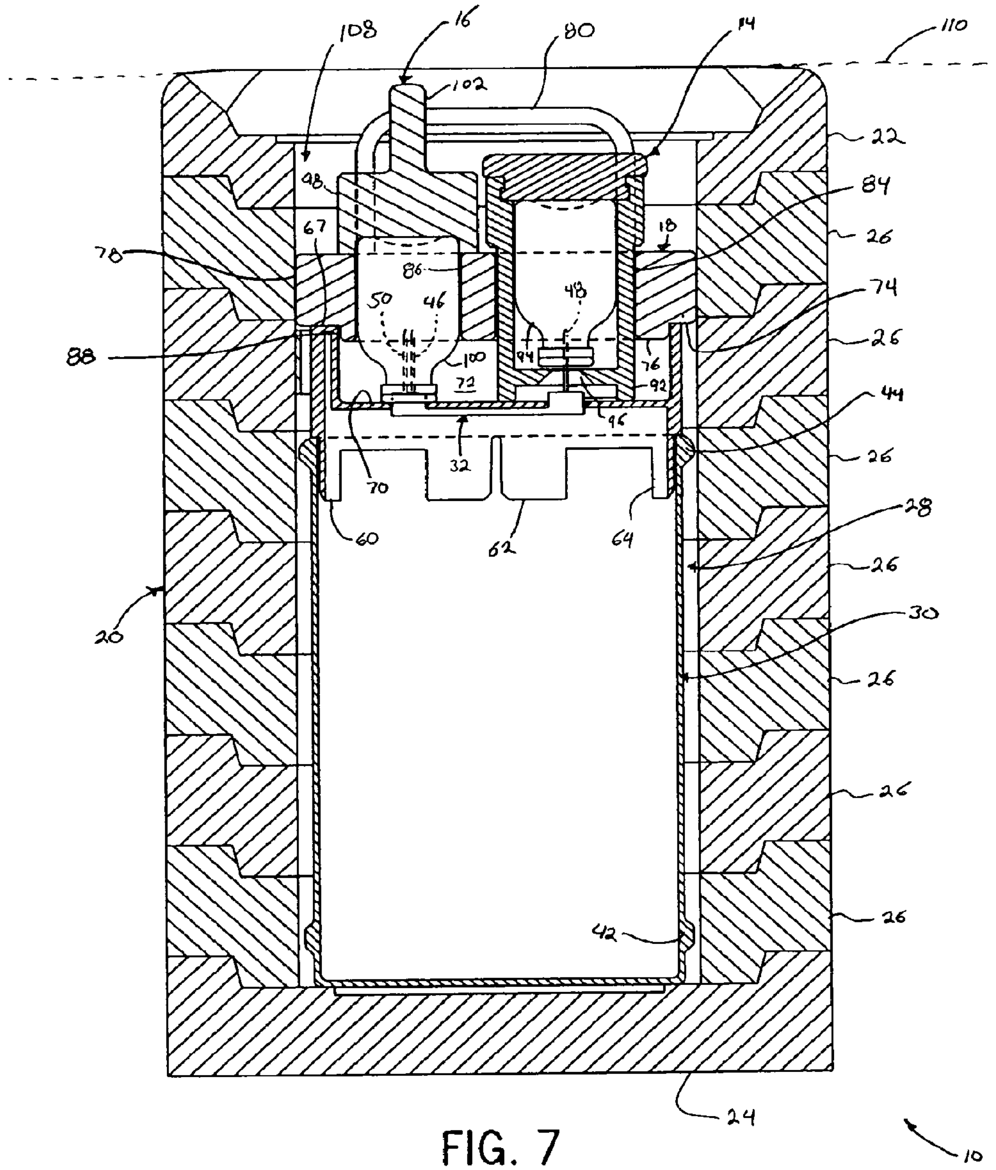
FIG. 7 is a cross-section of the radioisotope elution system.

Externally, the illustrated generator body 30 includes a lifting strap 36, two strap supports 38, 40, and outer rings 42, 44. The two strap supports 38, 40 extend upward from the generator body 30 and pivotably interconnect (e.g., connect in a manner that enables pivoting or pivot-like motion (e.g., flexing, elastic deformation, etc.)) to opposing ends of the lifting strap 36. The outer rings 42, 44 are near the top and bottom of the generator body 30, respectively. As depicted in FIG. 7, the outer rings 42, 44 extend radially from the generator body and limit the range of non-axial movement (e.g., movement other than up or down translation) of the generator body 30 within the auxiliary shield 20.

The needle assembly 32 may include an input needle 46, an output needle 48, and a vent needle 50. The tubing in the generator body 30 may fluidly interconnect (e.g., connect either directly or indirectly in a manner that enables fluid to flow there between) to needles 46, 48, and/or 50. Specifically, the input needle 46 may fluidly interconnect with an input to the elution column, and the output needle 48 may fluidly interconnect with an output from the elution column. The vent needle 40 may vent to atmosphere to equalize pressure during an elution, as explained below. The needles 46, 48, 50 are hollow to facilitate fluid flow therein.

The cap 34 may include needle apertures 52, 54, support channels 56, 58, tabs 60, 62, 64, 66, a top surface 67, and an alignment structure 68. Here, the term "alignment structure" refers to a member or surface that reduces the range of relative motion between two components as those components are interconnected, coupled, or brought into proximity. In other words, an alignment structure reduces the number of degrees of freedom between components as the components are interfaced (e.g., brought into contact with each other or an intermediary component such that mechanical forces may be transmitted from one alignment structure to another). The needle apertures 52, 54 are disposed within the alignment structure 68. In other embodiments, the needle apertures 52, 54 may be positioned elsewhere relative to the alignment structure 68, e.g., not within it or on a separate component. The support channels 56, 58 are shaped to complement the strap supports 38, 40 and orient the cap 34 relative to the generator body 30. That is, the support channels 56, 58 cooperate with the strap supports 38, 40 to align the cap 34 to the generator body 30 in one of a finite number of discrete orientations and positions, such as a single orientation and position.

The illustrated alignment structure 68 generally defines a cylinder with an oval base 70 and walls 72 that are generally perpendicular to the base 70. As used herein, the term "cylinder" refers to a surface or solid bounded by two parallel planes and generated by a straight line (i.e., a generatrix) moving parallel to the given planes and tracing a curve (including but not limited to a circle) bounded by the planes and lying in a plane perpendicular or oblique to be given planes. The base 70 is generally parallel to the base 24 of the auxiliary shield 20, and the cylinder defined by the alignment structure 68 has a single plane of symmetry that is generally perpendicular to the base 70. The illustrated alignment structure 68 is recessed in word into the cap 34 and may be generally characterized as a female alignment structure. In other embodiments, the alignment structure 68 may have a variety of different shapes and configurations. For example, the alignment structure 68 may be generally asymmetric, or the alignment structure 68 may extend outward from the cap 34. As described below, the alignment structure 68 may align the lid 18 to the radioisotope generator 28.

Figure 4:
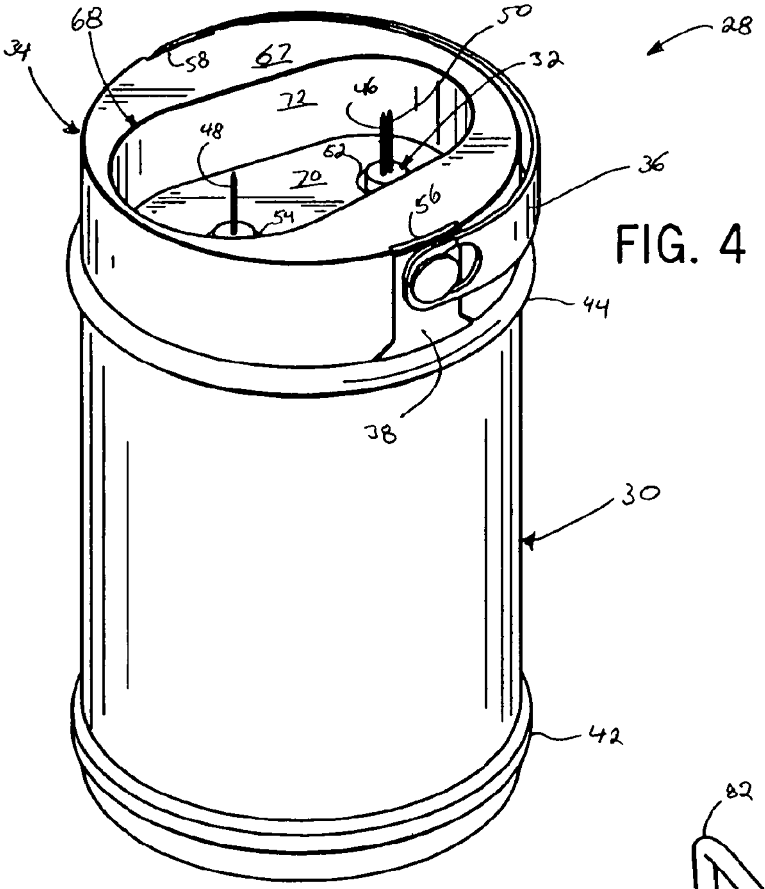
FIG. 4 is a perspective view of a radioisotope generator.

FIG. 4 depicts the radioisotope generator 28 in an assembled state. The needle assembly 32 is disposed between the cap 34 and the generator body 32. The needles 46, 48, 50 extend through the apertures 52, 54, and the tabs 60, 62, 64, 66 are inserted into the generator body 32. Additionally, the strap supports 38, 40 are aligned with and inserted in the support channels 56, 58, respectively, thereby generally fixing the position and orientation of the cap 34 relative to the generator body 30.

Figure 5:
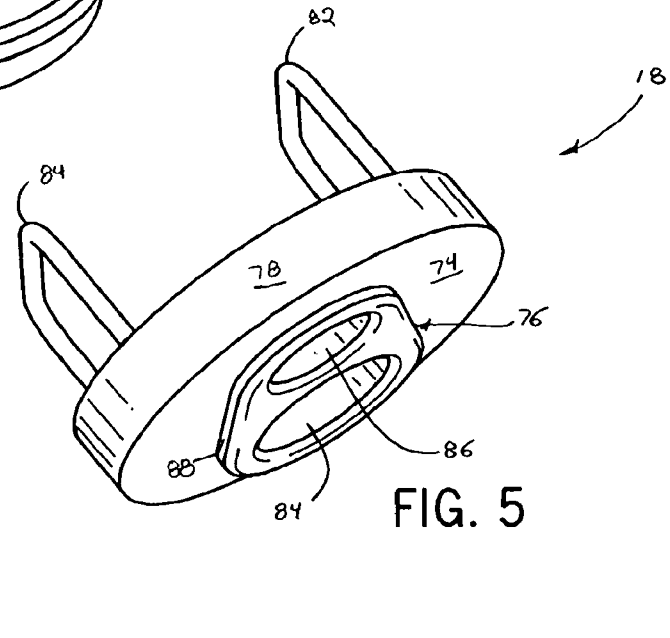
FIG. 5 is a perspective view of an auxiliary shield lid.

With reference to FIGS. 2, 3, and 5, the lid 18 will now be described. In the present embodiment, the lid 18 includes a bottom surface 74, a complementary alignment structure 76, a sidewall 78, handles 80, 82, an elution tool aperture 84, and an eluant aperture 86. The lid 18 may be made of appropriate radiation shielding materials, such as those discussed above. The handles may be generally U-shaped. The illustrated complementary alignment structure 76, which may be generally characterized as a male alignment structure, extends downward from the bottom surface 74 and includes a mating surface 88 that is generally perpendicular to the bottom surface 74. The complementary alignment structure 76 generally defines a right cylinder (e.g., a cylinder with sidewalls that are perpendicular to the base) with an oval base that is complementary (e.g., keyed) to the alignment structure 68. In other words, the complementary alignment structure 76 is configured to mate with the alignment structure 68 on the radioisotope generator 30. When the alignment structures 76, 68 are mated, the sidewall 72 may be in contact with or proximate to the mating surface 88 on the lid 18, and contact between the surfaces may reduce the number of degrees of relative freedom between these components. In short, the alignment structures 76, 78 may cooperate to align the lid 18 with the radioisotope generator 30.

The elution tool aperture 84 and eluant aperture 86 extend through the illustrated lid 18. These apertures 84, 86 may have a generally circular horizontal cross-section that is generally constant through at least a portion of the vertical thickness of the lid 18. The apertures 84, 86 may be disposed within and extend through the complementary alignment structure 76. In other embodiments, these features 84, 86, 76 may be disposed else elsewhere with respect to one another. The eluant aperture 86 may include a flared portion 90 (see FIGS. 3 and 6) for positioning subsequently discussed components.

Referring general to FIGS. 2 and 3, the elution tool 14 may have a generally cylindrical shape and include an outer shield 92 and an eluate receptacle 94. The outer shield 92 is made of radiation shielding material, such as those discussed above, and is shaped to be inserted through the elution tool aperture 84 on the lid 18. During insertion, contact between the outer shield 92 and the elution tool aperture 84 may generally confine the elution tool 14 to translating up and down and substantially prevent the elution tool 14 from translating horizontally or rotating about a horizontal axis (e.g., rotating end-over-end). In other words, the elution tool aperture 84 may cooperate with the outer shield 92 to position the elution tool 14 over the input needle 48 and guide the elution tool 14 along a path that is generally parallel (e.g., coaxially) with the input needle 48, thereby generally preventing the elution tool 14 from potentially damaging the input needle 48. The eluate receptacle 94 may be generally enveloped by the outer shield 92 with the exception of an aperture 96 in the bottom of the outer shield 92. The eluate receptacle 94 may include an evacuated vial, a conduit, or some other container configured to receive fluid from the output needle 48 on the radioisotope generator 28.

The eluant assembly 16 may include an eluant shield 98 and an eluant source 100. The illustrated eluant shield 98 has a handle 102, guide members 104, 106, and a recessed portion 108. The eluant shield 98 may be made of radiation shielding material, such as those materials discussed above. The guide members 104, 106 are shaped to fit within the flared portion 90 of the lid 18 and guide the eluant shield 98 into a resting position on the lid 18 (see FIG. 1). The recessed portion 108 generally corresponds to the shape of the top of the eluant source 100, which may be a vial of saline or other appropriate fluid. The eluant source 100 has a generally cylindrical shape and is sized such that it may pass through the eluant aperture 86 in the lid 18. When the eluant source 100 is inserted through the eluant aperture 86, contact with the walls of the eluant aperture 86 many generally constrain movement of the eluant source to up-and-down translation and rotation about a vertical axis. In other words, this contact may tend to prevent the eluant source 100 from translating horizontally or rotating about a horizontal axis during insertion. That is, the position and orientation of the eluant aperture 86 generally determines the position and orientation of the eluant source 100 when the eluant source 100 is positioned therein.

Figure 6:
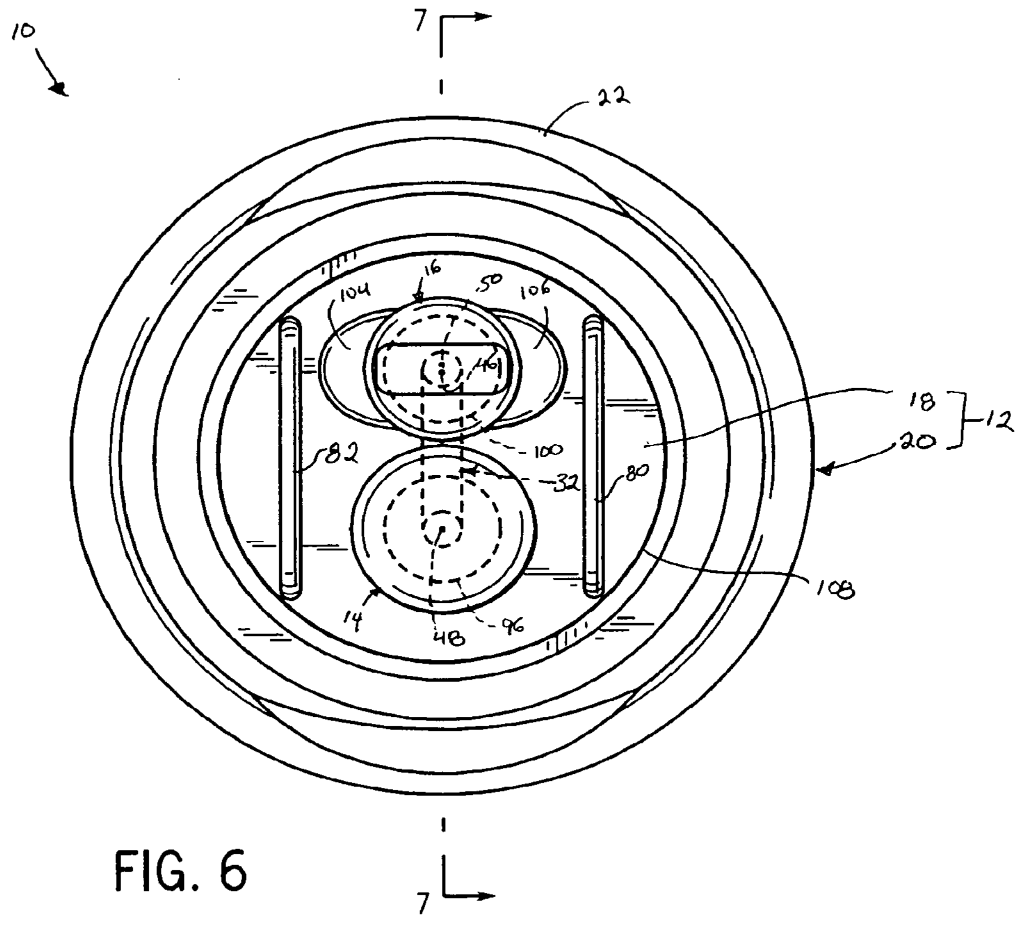
FIG. 6 is a top view of the radioisotope elution system.

FIGS. 6, 7 depict top and cross-section views, respectively, of the assembled radioisotope elution system 10. The radioisotope generator 28 is positioned within a cylindrical receptacle 108 in the auxiliary shield 20, and the top surface 67 of the cap 34 recessed below a top plane 110 of the auxiliary shield 20. Contact between the outer rings 42, 44 and the walls of the cylindrical receptacle 108 may tend to reduce horizontal translation of the radioisotope generator 28 and rotation of the radioisotope generator 28 about horizontal axes (e.g., rotating end-over-end). The lid 18 also fits into the cylindrical receptacle 108, and the shape of the outer walls 78 generally corresponding to the shape of the side walls of the cylindrical receptacle 108. Contact between the sidewalls 78 and the sidewalls of the cylindrical receptacle 108 may tend to reduce horizontal translation of the lid 18 and rotation of the lid 18 about horizontal axes. The lid 18 may be generally free to slide vertically within the cylindrical receptacle 108 until the bottom surface 74 of the lid 18 makes contact with the top surface 67 of the cap 34. In other words, the lid 18 may rest on the radioisotope generator 28 with the radioisotope generator 28 carrying the weight of the lid 18.

A variety of components may interface with the lid 18. As discussed above, the eluant source 100 may slide through the eluant aperture 86 in the lid 18, and contact between these components 86, 100 may tend to reduce horizontal translation of the eluant source 100 and rotation of the eluant source 100 about horizontal axes. Similarly, the elution tool 14 may slide through the elution tool aperture 84, and contact between these components 14, 84 may tend to reduce horizontal translation of the elution tool 14 and rotation of the elution tool 14 about horizontal axes. In other words, the lid 18 may tend to constrain movement of the elution tool 14 and eluant source 100 to an up-and-down motion that is parallel (e.g., coaxial) with the needles 46, 48, 50 as these components 14, 100 are brought in contact with the needles 46, 48, 50. Aligning the elution tool 14 and eluant source 100 with the needles 46, 48, 50 before they make contact may reduce the chances of the needles 46, 48, 50 being damaged. The eluant shield 98 may rest on the lid 18 and cover a portion of the eluant source 100 that extends above a top of the lid 18.

In the assembled state depicted by FIGS. 6, 7, the lid 18 is aligned to the radioisotope generator 28. The complementary alignment structure 76 on the lid 18 is inserted into the alignment structure 68 on the cap 34. Contact between the sidewalls 88 of the complementary alignment structure 76 and the sidewalls 72 of the alignment structure 68 may tend to reduce rotation of the lid 18 about vertical axes and reduce horizontal translation of the lid 18. In other words, when assembled, the lid 18 and radioisotope generator 28 generally have a single degree of freedom, i.e., vertical translation of the lid 18 in the cylindrical receptacle 108 away from the radioisotope generator 28. Other embodiments may include a latch or locking device for the lid 18 and reduce the number of degrees of freedom to zero.

In operation, an eluant inside the eluant source 100 is circulated through the inlet needle 46, through the radioisotope generator 28 (including the elution column), and out through the outlet needle 48 into the eluate receptacle 94. This circulation of the eluant washes out or generally extracts a radioactive material, e.g., a radioisotope, from the radioisotope generator 28 into the eluate receptacle 94. For example, one embodiment of the radioisotope generator 28 includes an internal radiation shield (e.g., lead shell) that encloses a radioactive parent, such as molybdenum-99, affixed to the surface of beads of alumina or a resin exchange column. Inside the radioisotope generator 28, the parent molybdenum-99 transforms, with a half-life of about 66 hours, into metastable technetium-99m. The daughter radioisotope, e.g., technetium-99m, is generally held less tightly than the parent radioisotope, e.g., molybdenum-99, within the radioisotope generator 28. Accordingly, the daughter radioisotope, e.g., technetium-99m, can be extracted or washed out with a suitable eluant, such as an oxidant-free physiologic saline solution. Upon collecting a desired amount (e.g., desired number of doses) of the daughter radioisotope, e.g., technetium-99m, within the eluate receptacle 94, the elution tool 14 can be removed from the radioisotope elution system 10. As discussed in further detail below, the extracted daughter radioisotope can then, if desired, be combined with a tagging agent to facilitate diagnosis or treatment of a patient (e.g., in a nuclear medicine facility).

The illustrated radioisotope elution system 10 is a dry elution system. Prior to an elution, the eluant receptacle 94 is substantially evacuated, and the eluant source 100 is filled with a volume of saline that generally corresponds to the desired volume of radioisotope solution. During an elution, the vacuum in the eluant receptacle 94 draws saline from the eluant source 100, through the radioisotope generator 28, and into the eluant receptacle 94. After substantially all of the saline has been drawn from the eluant source 100, a remaining vacuum in the eluant receptacle 94 draws air through the radioisotope generator 28, thereby removing fluid that might otherwise remain in the radioisotope generator 28. Air or other appropriate fluids may flow into the eluant source 100 through the vent needle 50 and into the radioisotope generator 28 through the input needle 46. The volume and pressure of the eluant receptacle 94 may be selected such that substantially all of the eluant fluid is drawn out of the radioisotope generator 28 by the end of an elution operation.

In view of the operation of the elution system 10, proper alignment of the various components may be particularly important to the life of the needles 46, 48, 50 and, thus, proper circulation of the eluant from the eluant source 100 through the radioisotope generator 28 and into the eluant receptacle 94. For example, when the eluant source 100 is coupled to the needles 46, 50, it may bend the needles 46, 50 if not properly aligned. Similarly, pressing the elution tool 14 down onto the needle 48 may bend the needle 48 if the elution tool 14 is not properly aligned. Certain embodiments of a subsequently described elution process may align the eluant source 100 with the needles 46, 50 before the eluant source 100 contacts the needles 46, 50 and, also, may align the elution tool 14 with the needle 48 before the elution tool 14 contacts the needle 48. Moreover, certain embodiments may guide the elution tool 14 and the eluant source 100 through an up or down movement that is parallel with the needles 46, 48, 50 when the elution tool 14 and eluant source 100 are positioned over the needles 46, 48, 50 and properly oriented.

Figure 8:
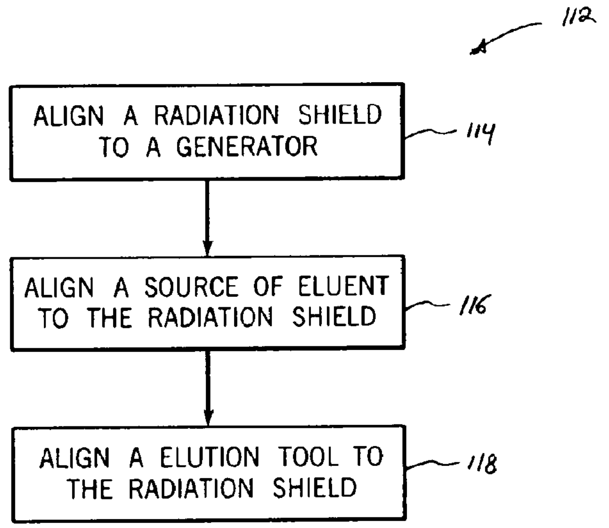
FIG. 8 is a flow chart of an elution process.

An elution process 112 will now be described with reference to FIG. 8. Initially, a radiation shield, such as the lid 18, is aligned to a generator, as depicted by block 114. In the embodiment of FIGS. 1-7, aligning a radiation shield includes interfacing the alignment structure 68 on the cap 34 with the complementary alignment structure 76 on the lid 18. The lid 18 is inserted into the cylindrical receptacle 108 in the auxiliary shield 20 and lowered until the lid 18 makes contact with the top surface 67 of the cap 34. Then the lid 18 is rotated about a vertical axis within the cylindrical receptacle 108 until the complementary alignment structure 76 slides into the alignment structure 68. The complementary alignment structure 76 is inserted into the alignment structure 68 until the bottom surface 74 of the lid 18 makes contact with the top surface 67 of the cap 34. At this point, the position and orientation of the lid 18 is generally determined by the position and orientation of the radioisotope generator 28. In other words, the lid 18 is referenced to the radioisotope generator 28. Once aligned, in some embodiments, lid 18 and radioisotope generator 28 may have a single degree of relative freedom: for example, the lid 18 may translate vertically within the cylindrical receptacle 108, but the lid 18 may be generally obstructed from rotating about horizontal or vertical axes or translating horizontally. Because the lid 18 can translate vertically within the cylindrical receptacle 108, the radioisotope elution system 10 may accommodate radioisotope generators 28 of a variety of sizes. In other words, the lid 18 is able to self-adjust the height to match the generator 28. For example, the lid 18 may translate further into the cylindrical receptacle 108 to accommodate a smaller radioisotope generator 28 or less distance to accommodate a larger radioisotope generator 28.

After aligning the radiation shield to the generator, a source of eluant may be aligned to the radiation shield, as depicted by block 116. For example, the eluant source 100 may be aligned to the lid 18. Aligning the eluant source 100 may include vertically orienting eluant source 100 over the eluant aperture 86 and inserting the eluant source 100 through the eluant aperture 86 until the needles 46, 50 have substantially penetrated the eluant source 100. Because the lid 18 is aligned (or referenced) to the radioisotope generator 28 and the eluant source 100 is aligned (or referenced) to the lid 18, the eluant source 100 may be aligned (or referenced) to the radioisotope generator 28. Moreover, the path traveled by the eluant source 100 as it interfaces or makes contact with the needles 46, 50 may be controlled by the eluant aperture 86. That is, the eluant aperture 86 may guide the eluant source 100 onto the needles 46, 50 in a path that is substantially parallel to the needles 46, 50.

Next an elution tool is aligned to the radiation shield, as depicted by block 118. In the embodiment of FIGS. 1-7, the elution tool 14 may be aligned with the elution aperture 84 on the lid 18. Aligning the elution tool 14 may include positioning the elution tool 14 over the elution aperture 84 and vertically orienting the elution tool 14 so that it may be inserted into the elution aperture 84. As the elution tool 14 is inserted, the elution receptacle 94 may vertically translate in a direction that is parallel with the needle 48. That is the eluant aperture 84 may guide the elution tool 14 onto the needle 48 in a path and orientation that are referenced to the needle 48. During insertion, movement of the elution tool 14 relative to the needle 48 and radioisotope generator 28 may be generally limited to vertical translation and rotation about a vertical axis.

Figure 9:
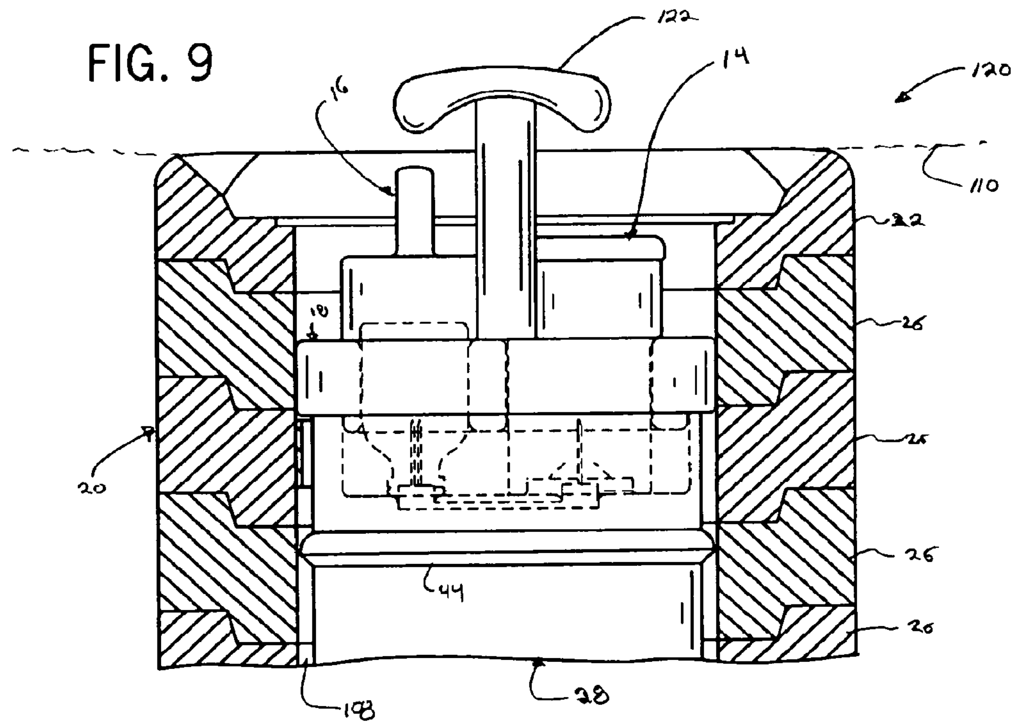
FIG. 9 is a cross-section of a second embodiment of a radioisotope elution system.

FIG. 9 depicts another radioisotope elution system 120. The embodiment of FIG. 9 includes a T-shaped handle 122 that extends upward from the lid 18 and through the top plane 110 of the auxiliary shield 20. The present embodiment includes a pair of T-shaped handles 122 symmetrically dispose on the lid 18. Other embodiments may include handles with different shapes and/or handles that do not extend above the top plane 110.

Figure 10:
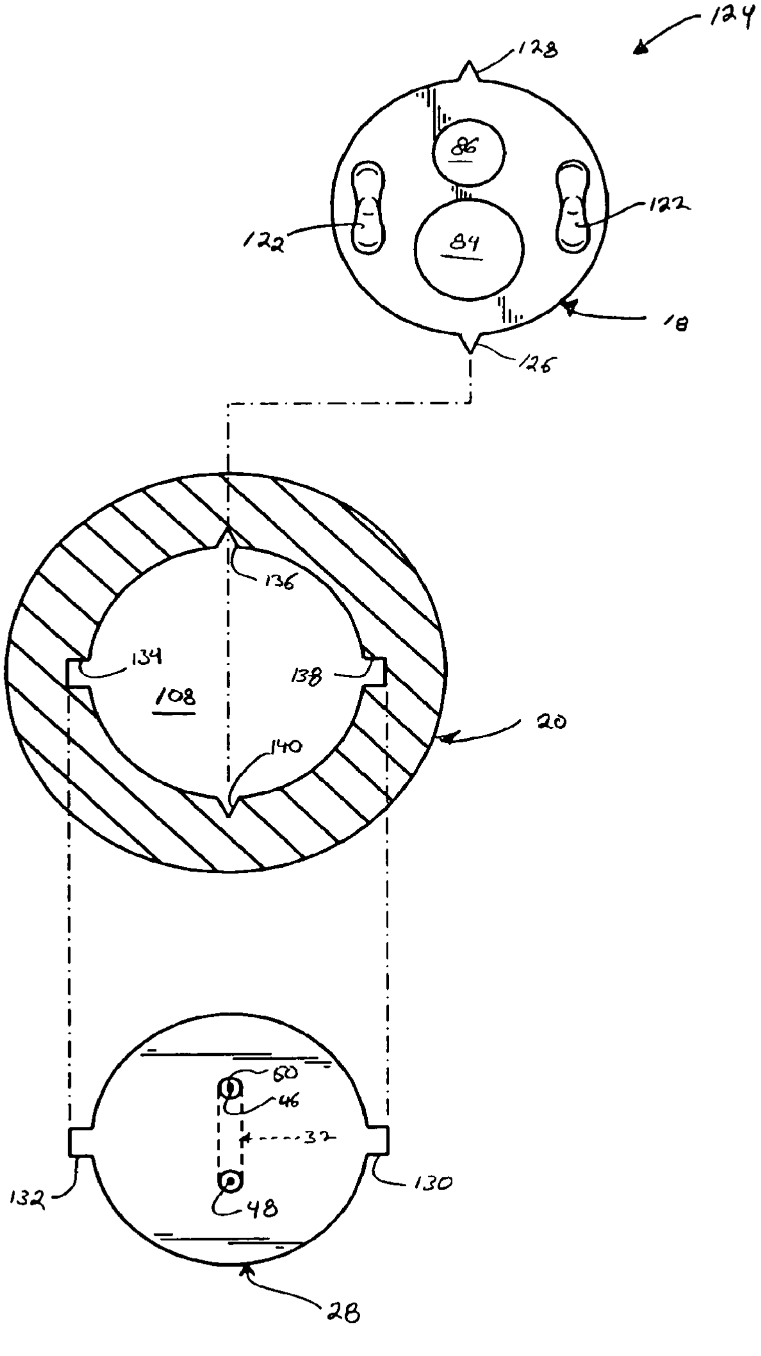
FIG. 10 is a top exploded view of a third embodiment of a radioisotope elution system.

FIG. 10 depicts a radioisotope elution system 124 that is configured to indirectly align the lid 18 with the radioisotope generator 28. In the present embodiment, the lid 18 includes alignment structures 126, 128, and the radioisotope generator 28 includes alignment structure 130, 132. The auxiliary shield 20 includes complementary alignment structures 134, 136, 138, 140, which mate with (or are keyed to) the alignment structures 128, 126, 130, 132. Specifically, the triangle-shaped alignment structures 128, 126 on the lid 18 interface with the complementary alignment structures 136, 140 to align the lid 18 to the auxiliary shield 22. Similarly, the square-shaped alignment structures 130, 132 interface with the complementary alignment structures 134, 138 to align the radioisotope generator 28 to the auxiliary shield 22. That is, both the radioisotope generator 28 and the lid 18 are aligned to the auxiliary shield 22, thereby aligning these components 18, 28 with each other. In other words, the lid 18 is indirectly aligned with the radioisotope generator 28 through the auxiliary shield 22. Other embodiments may include alignment structures with different shapes, different positions, and/or other intermediary components.

Figure 11:
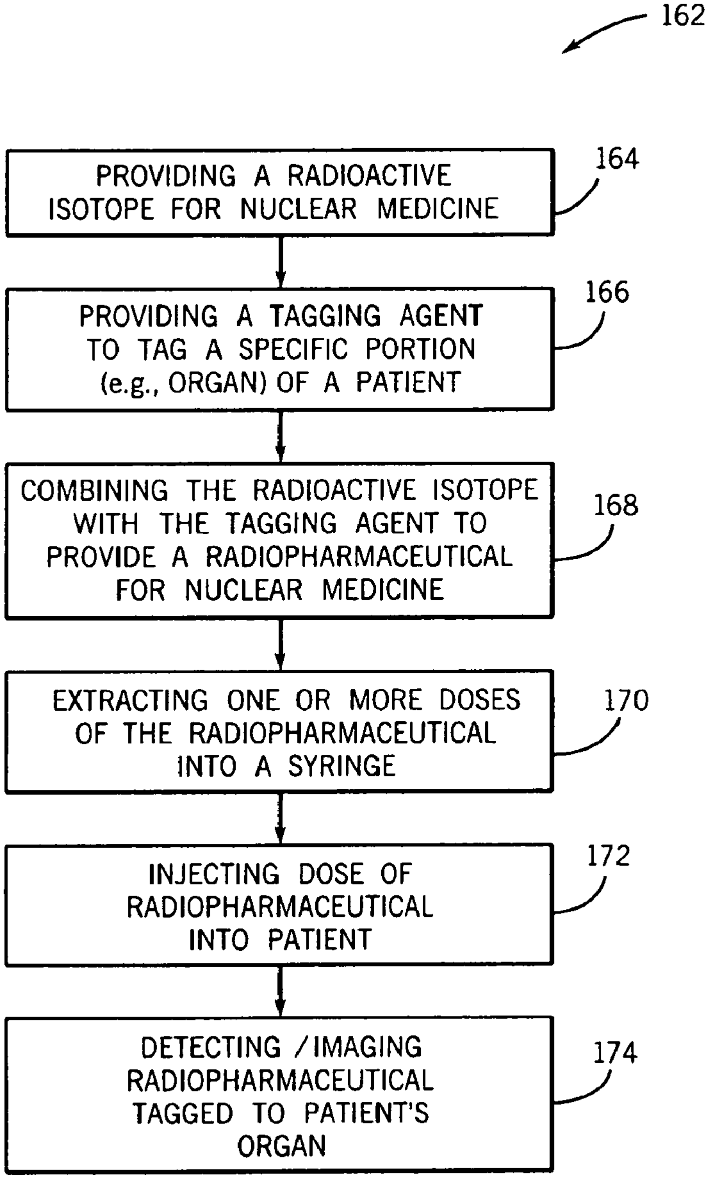
FIG. 11 is a flow chart of a nuclear medicine process.

FIG. 11 is a flowchart illustrating an exemplary nuclear medicine process that uses the radioactive isotope produced by the previously discussed radioisotope elution systems 10, 110, 124. As illustrated, the process 162 begins by providing a radioactive isotope for nuclear medicine at block 164. For example, block 164 may include eluting technetium-99m from the radioisotope generator 22 illustrated and described in detail above. At block 166, the process 162 proceeds by providing a tagging agent (e.g., an epitope or other appropriate biological directing moiety) adapted to target the radioisotope for a specific portion, e.g., an organ, of a patient. At block 168, the process 162 then proceeds by combining the radioactive isotope with the tagging agent to provide a radiopharmaceutical for nuclear medicine. In certain embodiments, the radioactive isotope may have natural tendencies to concentrate toward a particular organ or tissue and, thus, the radioactive isotope may be characterized as a radiopharmaceutical without adding any supplemental tagging agent. At block 170, the process 162 then may proceed by extracting one or more doses of the radiopharmaceutical into a syringe or another container, such as a container suitable for administering the radiopharmaceutical to a patient in a nuclear medicine facility or hospital. At block 172, the process 162 proceeds by injecting or generally administering a dose of the radiopharmaceutical into a patient. After a pre-selected time, the process 162 proceeds by detecting/imaging the radiopharmaceutical tagged to the patient's organ or tissue (block 174). For example, block 174 may include using a gamma camera or other radiographic imaging device to detect the radiopharmaceutical disposed on or in or bound to tissue of a brain, a heart, a liver, a tumor, a cancerous tissue, or various other organs or diseased tissue.

Figure 12:
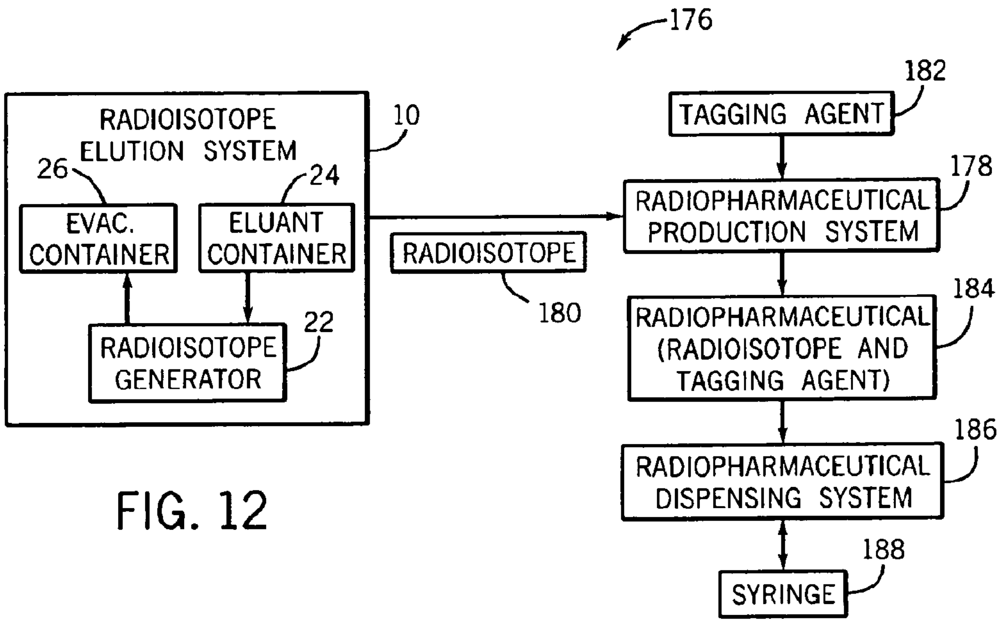
FIG. 12 is a diagram of a system for loading a syringe with a radioisotope.

FIG. 12 is a block diagram of an exemplary system 176 for providing a syringe having a radiopharmaceutical disposed therein for use in a nuclear medicine application. As illustrated, the system 176 includes the radioisotope elution systems 10, 110, 124. The system 176 also includes a radiopharmaceutical production system 178, which functions to combine a radioisotope 180 (e.g., technetium-99m solution acquired through use of the radioisotope elution system 10) with a tagging agent 182. In some embodiment, this radiopharmaceutical production system 178 may refer to or include what are known in the art as "kits" (e.g., Technescan® kit for preparation of a diagnostic radiopharmaceutical). Again, the tagging agent may include a variety of substances that are attracted to or targeted for a particular portion (e.g., organ, tissue, tumor, cancer, etc.) of the patient. As a result, the radiopharmaceutical production system 178 produces or may be utilized to produce a radiopharmaceutical including the radioisotope 180 and the tagging agent 182, as indicated by block 184. The illustrated system 176 may also include a radiopharmaceutical dispensing system 186, which facilitates extraction of the radiopharmaceutical into a vial or syringe 188. In certain embodiments, the various components and functions of the system 176 are disposed within a radiopharmacy, which prepares the syringe 188 of the radiopharmaceutical for use in a nuclear medicine application. For example, the syringe 188 may be prepared and delivered to a medical facility for use in diagnosis or treatment of a patient.

Figure 13:
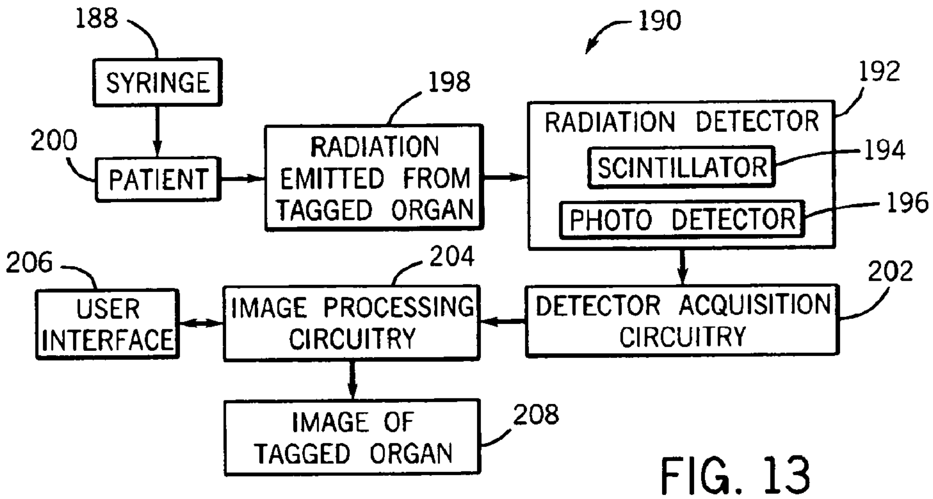
FIG. 13 is a diagram of a nuclear imaging system.

FIG. 13 is a block diagram of an exemplary nuclear medicine imaging system 190 utilizing the syringe 188 of radiopharmaceutical provided using the system 176 of FIG. 12. As illustrated, the nuclear medicine imagining system 190 includes a radiation detector 192 having a scintillator 194 and a photo detector 196. In response to radiation 198 emitted from a tagged organ within a patient 200, the scintillator 194 emits light that is sensed and converted to electronic signals by the photo detector 196. Although not illustrated, the imaging system 190 also can include a collimator to collimate the radiation 198 directed toward the radiation detector 192. The illustrated imaging system 190 also includes detector acquisition circuitry 202 and image processing circuitry 204. The detector acquisition circuitry 202 generally controls the acquisition of electronic signals from the radiation detector 192. The image processing circuitry 204 may be employed to process the electronic signals, execute examination protocols, and so forth. The illustrated imaging system 190 also includes a user interface 206 to facilitate user interaction with the image processing circuitry 204 and other components of the imaging system 190. As a result, the imaging system 190 produces an image 208 of the tagged organ within the patient 200. Again, the foregoing procedures and resulting image 208 directly benefit from the radiopharmaceutical produced by the elution systems 10, 110, 124.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cap all modifications, equivalents, and alternatives falling within the spirit and scope of the invention as defined by the following appended claims.

The invention claimed is:

1. A radiation shield lid comprising:

a top and an opposing bottom, wherein the bottom comprises a bottom surface;

a first aperture defined in the lid and extending completely through the lid from the top to the bottom;

a second aperture defined in the lid and extending completely through the lid from the top to the bottom, wherein the second aperture is separate from the first aperture; and a male alignment structure extending downward from the bottom surface away from the top of the lid, the male alignment structure having a periphery that surrounds the first and second apertures at the bottom surface of the lid;

wherein the lid comprises at least one radiation shielding material selected from depleted uranium, tungsten, tungsten impregnated plastic, or lead.

2. The radiation shield lid of claim 1, wherein sidewalls of the shield lid are substantially parallel to sidewalls of the male alignment structure.

3. The radiation shield lid of claim 1 in combination with an auxiliary shield that has a first complementary alignment structure that is keyed to the male alignment structure on the lid and a second complementary alignment structure that is keyed to another alignment structure on a radioisotope generator.

4. The radiation shield lid of claim 1, wherein the male alignment structure is integrally formed with the bottom surface of the shield lid.

5. The radiation shield lid of claim 1 in combination with an auxiliary shield having a generator receptacle defined therein, wherein at least the male alignment structure on the shield lid fits within the generator receptacle.

6. The radiation shield lid of claim 1, wherein the male alignment structure defines a right cylinder with an oval base.

7. The radiation shield lid of claim 1, wherein the male alignment structure further comprises a substantially planar surface that extends from the periphery to the first and second apertures.

8. The radiation shield lid of claim 1, further comprising a pair of handles extending from the top of the shield lid.

9. The radiation shield lid of claim 8, wherein each of the pair of handles is U-shaped.

10. The radiation shield lid of claim 1, wherein the first and second apertures each have a constant circular cross-section through at least a portion of the shield lid.

11. The radiation shield lid of claim 1, wherein the first aperture includes a flared portion at the top of the shield lid.

* * * * *